United States Patent [19]

Jolly et al.

[11] 3,821,429
[45] June 28, 1974

[54] PROCESS FOR MANUFACTURING INSTANT COFFEE AND THE PRODUCT OF SAID PROCESS

[75] Inventors: Michael P. Jolly, Highland Mills; Norman P. Quellette, Tarrytown, both of N.Y.; Rudolf A. Vitti, Dumont, N.J.; Salvatore M. Pinzone, Bronxville, N.Y.

[73] Assignee: General Foods Corporation, White Plains, N.Y.

[22] Filed: June 7, 1972

[21] Appl. No.: 260,679

[52] U.S. Cl................ 426/147, 426/193, 426/285, 426/453
[51] Int. Cl. .......................................... A23f 1/08
[58] Field of Search............... 99/DIG. 4, 71, 152; 426/147, 193, 285, 453

[56] References Cited
UNITED STATES PATENTS
3,443,961  5/1969  Kaleda et al.................. 99/71
3,485,637  12/1969  Adler et al..................... 99/DIG. 4
3,493,389  2/1970  Hair et al........................ 99/71
3,554,760  1/1971  Sienkeiwicz et al............ 99/DIG. 4
3,660,108  5/1972  Mednis........................... 99/DIG. 4
3,687,683  8/1972  Kaplan et al.................. 99/DIG. 4

Primary Examiner—Frank W. Lutter
Assistant Examiner—William L. Mentlik
Attorney, Agent, or Firm—Bruno P. Sturzzi; Michael J. Quillinan; Daniel J. Donovan

[57] ABSTRACT

Ground, spray dried coffee spheres are agglommerated in a hot, humid atmosphere to effect fusion thereof at points of contact under conditions which produce a coarse moist agglommerat-containing major fraction which is blended with a freeze dried drier minor fraction obtained from dilute, rapidly frozen quality extract ground to a particle size distribution approximating the major fraction, the frozen dilute extract being granulated, freeze dried, blended and hermetically packaged with the major fraction to provide a distinctive speckled blend suggestive of roasted and ground coffee appearance.

13 Claims, No Drawings

PROCESS FOR MANUFACTURING INSTANT COFFEE AND THE PRODUCT OF SAID PROCESS

CROSS-REFERENCE TO RELATED APPLICATIONS

This application is related in certain of the novel aspects to the pending application of Clinton, et al, Ser. No. 209,379 filed Dec. 17, 1971 for "Method for Producing A Homogeneous Dry Blended Product."

BACKGROUND OF THE INVENTION

This invention relates to the art of manufacturing a novel-appearing soluble coffee powder and more particularly is concerned with a practice whereby two dissimilar extracts of different form and appearance can be consistently blended without segregation after packaging.

DESCRIPTION OF THE PRIOR ART

The prior art heretofore has described processes wherein two dissimilar soluble coffee products are blended. Illustrative of this art is the teaching in British Patent Specification 1,102,587 published Feb. 7, 1968 and alluding to the blending of two extract fractions, the first being dried by conventional spray drying technique and the second, smaller fraction being freeze dried. Other art, as well as the aforesaid British specification describe the practice of coarsely granulating a frozen extract which is subsequently freeze dried; such processes endeavor to achieve the appearance of freshly roasted and ground coffee; cf also U.S. Pat. No. 3,244,553 to Clinton, et al, and U.S. Pat. No. 3,482,990 to Pfluger, et al; such art is now generally highly developed and contained in Class 99, Subclass 71 of the United States Patent Office Classification System.

Whereas some prior art workers and consumers are attracted by a product consisting primarily of coarsely granulated freeze dried coffee, other art such as U.S. Pat. No. 3,493,388 to Hair issued Feb. 3, 1970 and U.S. Pat. No. 3,554,761 to Carbonell issued Jan. 12, 1971, attempts to provide the appearance of a roasted and ground coffee form from dissimilarly colored and shaped particles. Thus, art workers have taught manufacture of soluble coffee particles in dissimilar spray dried and freeze dried form; a blended product having freeze dried components with a light brown color; the blend appearance is intended to be suggestive of lighter coffee grind particles intermixed with fresh roasted and ground coffee. The present invention deals with producing such a suggestive form of soluble coffee product derived from two dissimilarly appearing extracts and overcoming the associated problems encountered in combining same.

The problems involved in achieving a speckled or "pepper and salt" texture and appearance in soluble coffee blends suggestive of roasted and ground coffee containing chaff are many. By reason of dissimilarities in particle size and shape, as well as density, segregation of blend of particles will occur prior to or during packaging. This detracts greatly from jar appearance of the contents. The problem is particularly pronounced where it becomes desirable to employ freeze dried coffee as a substantial though minor fraction of the blend. Whereas certain current workers employ admixtures of soluble coffee agglommerates intermixed with freeze dried particles, there is a tendency of such dissimilar particles to segregate and powder. Fine particles abraded in mixing, packaging and package shipment of the freeze dried fraction and the agglommerated fraction, particularly the latter, accentuate the segregation problem and detract from appearance. Factors thought to contribute to mechanical strength of freeze dried particles, particularly, have been published by Peterson in the Tea and Coffee Trade Journal in Oct. 1971. Making of a strong fused agglomerate has also been taught. But such arts leave much to be desired when blending two dissimilarly dried particles, particularly when one is preferably derived from a differing extract than the other. Robustas are preferably a major constituent of the agglomerate component, but such agglomerates are quite prone to abrasion attributable to admixture with freeze dried coffee.

BRIEF SUMMARY OF THE INVENTION

In accordance with the present invention, spray dried soluble coffee spheres are finely ground and agglomerated in a humidifying heated atmosphere to a moist toughened condition, preferably fostered by having fine and reground coarse agglomerate fractions recycled to the agglommerating zone by a process to be hereinafter described, to produce a moderately coarse particle size distribution in a major blend fraction approximating that of a minor freeze dried granular fraction of comparable particle size distribution and compatible comparable shape; these blend fractions are then combined and hermetically packaged whereby they advantageously undergo moisture transfer from the major fraction to the minor one and assume a less friable packaged condition. The minor extract fraction preferably has a desired light color produced by rapidly freezing a relatively dilute extract, say less than 30 percent and greater than 15 percent solids, rapid freezing being understood to involve reduction of extract temperature from below the "ice point" to the so-called eutectic point over an elapsed period less than 15 minutes; it will be understood that the rates of freezing and freezing conditions generally required to achieve a comparatively light freeze dried granular component will be functions of extract concentration and freezing equipment and conditions, all of which are now well within the skill of the art of those wishing to achieve such a light color. As another feature of the invention, the rapidly frozen dilute extract is granulated while maintained at a temperature below the eutectic point to an extent such that a moderately coarse (retained on a 40 mesh and passing a 16 mesh) though minor subfraction of the freeze dried component in the total blend will be produced; this minimizes segregation of fines and large viewable but contrasting blend particles and has been found to reduce the tendency of said component to generate fines from the agglomerates of ground spray dried particles through blending and packaging therewith. The rapidly frozen dilute ground extract will preferably be freeze dried at a pressure typically below 500 microns and to a moisture content less than 3 percent.

The subdivided spheres of spray dried coffee at 1.0–3.0 percent moisture are cooled to below 80°F and then agglomerated into an aggregate or cluster created by fusion of melted coffee solids per se generated by heating the subdivided spherical particles in a hot, humid agglommerating zone wherein the individual particles are highly wetted, caused to contact one another and coincident with such contact and thereafter are caused to be elevated to the thermoplastic temperatures of the coffee particles, generally above 100°F, whereupon the fused agglommerates are caused to undergo free-fall in a vertical tower zone wherein they are only partially dried; a preferred embodiment calls for drying to no less than 4.5 percent moisture; the agglomerate may also be after-dried to a lower moisture of say about 3.0 percent or above after formation, but for some extracts such drying may weaken the toughness induced through wetting and so are less preferred. Thereafter the agglomerate is cooled to effectively set the fused condition achieved in the aforesaid heated and humidifying zone. To achieve the required particle size distribution and agglomerate shape as well as toughness to assure agglomerates will not "powder" to generate further fines in blending and packaging, larger scalped-sized agglommerates will be reground and together with unagglommerated sub-200 micron fines will be recycled to the hot, humidified agglomerating zone for reagglommeration with newly made unagglommerated ground spray dried particles, the percent recycled being preferably in excess of 20 percent and less than 60 percent. By reason of the pronounced wetting during agglommeration, the agglommerated particles are at a moisture level generally considered unstable therefor after agglommeration; usually above 4.5 percent moisture for Robusta blends. Advantage is taken of the hygroscopic nature of the freeze dried lower moisture fraction which accepts water vapor transferred thereto from the major fraction blended therewith, but unexpectedly does not become unstable per se despite elevation to an average moisture above 2.5 percent.

The freeze dried minor fraction of the blend preferably will be a quality extract such as is predominantly or exclusively derived from milds-type Columbians, Santos or blends thereof. This extract may have added thereto distilled aromatic material recovered as by steaming a bed of roasted and ground coffee and condensing a portion of the aromatics thus generated while discarding the less stable initially volatized aromatics. So too, extract to be freeze dried may have incorporated therein those aromatics recovered by steam or vacuum distillation of a coffee extract per se such as an extract percolated for use in either the spray dried fraction, the freeze dried fraction, or both such fractions. Likewise, grinder gas and coffee oil derived by expression or solvent extraction, or aromatics recovered by vacuum distillation of roasted and ground coffee can be beneficially incorporated into the extract to be freeze dried. U.S. Pat. Nos. to effect distillation and/or recovery of such aromas which may be so employed are:

3,132,947 to Mahlmann;
3,244,532 to Mahlmann;
3,615,655 to White, et al;
3,244,531 to Clinton, et al;
3,421,901 to Mahlmann;
3,420,674 to McCartney;
2,686,687 to Lemonnier;
2,875,063 to Feldman, et al;
3,021,218 to Clinton, severally assigned to the assignee of this application.

Advantageously, extract for the spray dried agglommerated component need not be endowed with these fugacious aromatics in the liquid extract per se, where they are likely to be spent or lost. Moreover, the extract for spray drying can be derived from a blend high or predominantly in a less expensive bean variety such as a Robusta type.

The blend of the aforesaid major and minor fractions will desirably be plated with a coffee oil to provide aromatization and flavor enhancement. The agglommerates-containing fraction will typically have a bulk density of 0.15 to 0.25 grams per cc, whereas the minor fraction will have a bulk density of 0.20 to 0.25 grams per cc. The particle size distribution of the major agglommerated fraction aforesaid will be such that 5 to 20 percent passes a U.S. 20 and is retained on a U.S. 40 mesh screen, whereas the aforesaid minor freeze dried fraction will have a particle size distribution such that between 5 and 15 percent passes a U.S. 20 and is retained on a U.S. 40 mesh screen. It will be understood that particle size distribution specified herein is of particles prior to oil plating thereof. Definition of the coarse particle in the case of the major as well as the minor fraction of the blend is difficult. Generally, the coarse particles of each fraction will have one or more faces that approach rhomboids or triangles.

The major fraction should have a moisture content substantially less than 7 percent and the freeze dried or minor fraction should have a moisture content less than 3 percent prior to blending. The minor fraction will generally constitute between 10 and 45 percent by weight of the constituency of the total blend, resulting in a blend moisture content less than 5 percent and greater than 2.5 percent container preferably the blend moisture will be less than 4.0 percent. have a jar-product moisture level less than 5 percent.

By reason of the foregoing recycle agglommerating procedure referred to and more fully described and referred to in the accompanying operative example, the major and minor fractions when blended will be consistently mixed so that there is a substantially uniform distribution of both coarse and fine particles of each fraction. To achieve such uniform particle size distribution, the blended fractions will be gravity fed with little or no vibration. The thus blended components are packaged in a previously nitrogen-purged containe r having less than 5 percent oxygen and hermetically sealed so as to have The utility of the present process is apparent in comparing like blends of freeze dried and spray dried agglommerated fractions wherein the coarse granular component of the freeze dried blend is compared with the migratory characteristics of the spray dried agglommerated blend-component when blends of the fractions are agitated. In the case of art mixtures having a large coarse granule consistency in the freeze dried fraction of the blend, the fines subfraction of both the freeze dried minor fraction and the spray dried major fraction will segregate into distinct phases. This is to be contrasted with the desired uniform distribution of the two dissimilar particles and fractions containing same which provide the desired aesthetic speckled appearance. Since packaged soluble coffee is distributed in glass jars wherein the components of the soluble powder blends are visible, such migration or segregation of the fine particles as well as the larger particles of one blend will be quite apparent. Such fines will coat the surface of the jar and detract generally from the aesthetic impression. This fines dusting on the jar is primarily a function of lack of oil plating of the spray dried fraction and the freeze dried fraction. On the other hand, by so controlling the agglommerating as well as the freeze drying and granulating conditions, the percentage of such fines generated in blending is lessened and thus the tendency for such unsightly collections is minimized.

A blend produced in accordance with the present invention will have a most appealing contrasting appearance when viewed through transparent panels of a glass container. A moderately light tan colored freeze dried component, though it is a minor weight percent of the total blend will nevertheless be quite pronounced in its viewability and its distinct even distribution throughout the major weight percent fraction composed of spray dried agglommerates. On the other hand, the agglommerates per se will be likewise distinctly viewable to contribute a dark background to the desired speckled contrasting, "pepper and salt" appearance. Such a novel blend will retain its aforesaid distribution of dark and light colored components which, despite the low frequency vibration experienced, can nevertheless generate an undesired amount of fines detracting from the preferred speckled appearance intended for the blend.

The agglommerate component or fraction of the blend will be seen microscopically to have its coarse particles in an unrounded condition; that is, the agglomerates will have substantially angularly related corners and present an overall irregular granular appearance. Indeed, it is preferred practice of the present invention that agglommeration of the major components be conducted in a manner that by reason of their angularly related size or extremities, contribute toward immobilization of the particle intermixed with the coarsely granulated freeze dried component.

On the other hand, it is important that the freeze dried component have the coarse particles of an intermediate size substantially approximating the size of the spray dried agglommerate. Whereas it is not clearly understood, it is believed that an intermediately sized coarse freeze dried particle is less likely to contribute to abrasion or friability of an otherwise structurally toughened agglommerated particle. For purposes of the present invention, therefore, it is most preferred that the freeze dried fraction have most of its particles between a 16 and 20 mesh U.S. Standard Sieve, preferably between 16 and 40 mesh; thus, a typical particle size distribution of the freeze dried fraction will have a major weight percent of its particles retained on a 40 mesh but passing a 12 mesh screen, with a major weight percent of the freeze dried fraction being retained on a 20 mesh screen.

The agglommerate or major weight fraction will have a like particle size distribution, that is, will have a particle size distribution such that most of the particles are retained on a 40 mesh screen and pass a 12 mesh screen, U.S. Standard Sieve. Ideally, those fractions retained on a +12, +20 and +40 screen will substantially approximate one another in weight percent of any given particle size distribution.

A typical particle size distribution range for the major fraction and the minor fraction is tabulated below.

| Freeze Dried Minor Fraction U.S. Standard Sieve | % | Agglommerated Major Fraction U.S. Standard Sieve | % |
|---|---|---|---|
| On 6 | 0 | On 6 | 0 |
| 8 | 0–5 | 8 | 0–10 |
| 12 | 10–15 | 12 | 15–25 |
| 20 | 50–65 | 20 | 30–60 |
| 40 | 10–20 | 40 | 10–25 |
| Through 40 | 5–15 | Through 40 | 5–20 |

In the agglommerating procedure to be practiced to achieve the desired non-migratory and balanced blend, it will be important to effect an agglommeration under conditions wherein the agglommerates are formed under free-fall conditions such as are practiced in the fusion agglommeration processes to be described hereinafter and incorporated by a reference herein, to wit, U.S. Pat. No. 3,554,760 to Sienkiewicz, et al, issued Jan. 12, 1971, and U.S. Pat. No. 3,424,589 to Kan, et al, issued Jan. 28, 1969, as well as U.S. Pat. No. 3,485,637 to Adler, et al, issued Dec. 23, 1969. These agglommeration practices employ a moistening and heating of the particles per se which are below 250 microns and typically have a major weight percent below 200 microns. The particles are caused to undergo fusion in a hot, humidified atmosphere such as is created by jets or nozzles of steam intersecting a descending curtain of vibrated fine particles and redirecting such particles while they are undergoing wetting to further promote collisions thereof. Preferably agglommeration will be practiced on soluble coffee particles having an initial moisture content between 1.5 percent and above 2.0 percent; the particles will be caused to undergo an increase in moisture content during agglommeration in the neighborhood of 1–5 percent overall. During the agglommeration as aforesaid and aforecited, the temperature of the agglommerates will undergo an increase such that the particles will range between 100° and 160°F; typically, the preferred particle temperature range of 110°–150°F will be obtained by employing an elongated vertical tower wherein inlet drying air at a temperature exceeding 250°F will be admitted to the zone of atomization at such a rate in relationship to the overall agglommerating zone that the air will have a wet bulb temperature between 130° and 200°F.

In order that agglommerates in the major fraction be of such toughness and strength that they will withstand the rigors imposed thereon in blending and packaging, it is desired that the spray dried coffee particle spheres will be ground and thus subdivided into fragments wherein a major percent of the spray dried particles are broken. To achieve this particulation, preferably to less than 100 microns, the spherical particles will be chilled as by cooling under liquid carbon dioxide and then ground in a hammermill. To maximize the tensile strength of the agglommerate the broken spheres are cooled to below 80°F and preferably to about 35°–42°F, and maintained at that reduced temperature up to entry to the agglommerating zone. In this way, the steam jets poised to intersect the falling curtain of dry particles form a much larger and wetter agglommerate and create a higher order of fusion at the points of contacts created in the agglommerating zone. In general, the ratio of pounds of steam to powder being agglommerated will be about equal and will range from 3:2 to 2:3. After the aforesaid fusion agglommeration wherein the particles have been elevated to a temperature above 100°F and generally to their thermoplastic point, the particles will be allowed to descend under the influence of gravity and will be collected at the bottom of a cocurrent drying tower, whereafter the particles will be cooled by refrigerated air to a subambient temperature and will be collected at a moisture content preferably less than 6.5% and typically in the neighborhood of 4.5 to 6.5 percent, more preferably between 4.75 and 5.5 percent; less preferably the agglommerate will be dried to a lower moisture level where less agglommerate toughness is practicable.

It will be appreciated by those skilled workers in the art that this weight percent of moisture is untypically high for an agglommerated spray dried powder, thus indicating the high order of wetting and agglommeration strength achieved. It will be essential that upon collection at the bottom of the tower the particles be cooled to well below 100°F in order to assure that the agglommerate sets. In this respect, it is considered most preferable that the cooled agglommerate be tempered; that is, allowed to repose without agitation at below 100°F for a period of time which will assure development of the requisite toughness for blending. Preferably, the agglommerate is introduced to a cooling tunnel wherein it is "set" and wherein the agglommerated particles are further strengthened. A preferred cooling tunnel will slide the agglommerates under gravity while under the influence of an upwardly circulating cold air stream. Ideally, the product will be cooled to a temperature of about 35°-45°F.

Most preferably, the moist agglommerate at a moisture content above 4.5 percent and typically above 4.75 percent will be screened to separate not only a fines or pan fraction of through 40 mesh but also to recover a scalped coarse fraction which will be recovered as a minor weight percent of the total agglommerated product after tempering. This scalp material and the pan fraction will be ground and together will be recycled at a preferred level of 25-35 percent back to the fresh agglommerating feeding area for agglommeration with the fine particle originally fed thereto. In this way, the agglommerate produced by the high order of wetting and the large exposure thereof to wetting and fusion will have an extraordinary degree of toughening affording the agglommerate with the structural stability to avoid powdering when admixed with the freeze dried minor fraction now to be described.

The extract for the minor fraction will preferably have a solids content of about 24 percent and range between 20 and 30 percent solids, generally, and thus will be considered comparatively dilute. A dilute extract is preferred to a concentrated one for the purposes of the present invention in order to achieve a granule of intermediate coarseness as explained hereinabove. Moreover, the dilute extract will be frozen relatively rapidly and typically in a period less than 15 minutes from the ice point of the extract, i.e., the point at which ice first starts to form upon temperature reduction, to below the eutectic point which will be in the neighborhood of −13.5°F. This comparatively rapid freezing is responsible for the light tan color in the ultimately freeze dried form of granule. The dilute extract will ideally have added thereto prior to freezing an enhancing aromatic constituent such as the steam or vacuum distilled aroma sources referred to hereinabove. The frozen extract may be caused to undergo some partial crystallization preparatory to being deposited on a freezing belt whereon it will be statically frozen, say in accordance with the practice set forth in U.S. Pat. No. 3,253,470 to DeGeorge which is the preferred freezing apparatus. Such partial crystallization will result in amorphous and less ordered crystalline structure which, for the purposes of producing an intermediate coarseness of grind will be of some advantage. It is preferred in accordance with the present mode to dynamically freeze the extract in 10 minutes on a six-section freezing belt refrigerated with a profile of −20°F followed by five succeeding zones of −40°F each. The slab thus reduced to a temperature in the neighborhood of −40°F will be ground to the aforesaid typical particle size distribution for the minor fraction and will be maintained in any event at a temperature below −13.5°F during grinding. The ground, frozen extract having aforesaid intermediate coarseness will have classified therefrom a significant percentage of the fine powders; that is, those passing a 40 mesh screen so as to assure that the minor as well as the major fraction will have a particle size distribution approximating one another and thus minimizing the tendency toward powderous separations; the fines may be redissolved and reworked in extract to be frozen or added to the extract directly prior to freezing as a seed.

The freeze dried granular component will have a moisture content typically below 3.0 percent and generally in the neighborhood of 1.0 to 2.5 percent, the moisture content being sufficiently reduced as a result of freeze drying to allow moisture present in the agglomerate fraction to undergo the transfer when packaged after blending and thus equilibrate in the jar. The major fraction having an agglommerate moisture content exceeding 4.0 percent and more commonly exceeding 5 percent, but preferably less than 6.5 percent, would normally be unstable if packaged at this moisture content. Since this agglommerated moisture level is important to effecting the requisite toughness for the agglommerate, the freeze dried component serves to adsorb a significant amount of the water present in the agglommerate after packaging. Somewhat unexpectedly, the level of moisture absorbed by the freeze dried granular component is not such as contributes to instability to any marked extent despite the comparative imbalance of a major fraction relatively high in moisture to a minor fraction lower in moisture.

The term "freeze dried" as it is employed herein is preferably but not by way of limitation intended to refer to the practice of lyophilizing the free water present in a coffee extract. Such a practice is set forth in U.S. Pat. No. 3,365,806 to Pfluger, et al. However, it should be understood that the term "freeze drying" in the sense of this application and the invention herein is intended to embrace a practice which may involve removal of a substantial though not a majority of the water present by sublimation. Thus, the coffee may be subjected in its initial freeze drying step to a true sublimation to be followed by a vacuum drying under conditions whereby the particle undergoes moisture melting and evaporation during the terminal stages of dehydration. Any form of such "freeze drying" may thus be practiced, but in any event, the minor fraction thus produced should be at a moisture content commonly less than 3.0 percent.

Finally, the major and minor fractions will be plated after blending with a coffee oil preferably at a level of 0.25 percent by weight of the total blend and typically at a range of 0.15 to 0.35 percent. The coffee oil serves, in addition to aromatization, to minimize the powderous character of the blend to begin with or of the fines that may be generated during blending and packaging. Since the blend of the agglommerate and the granule is intended to retain to a maximum extent practical the appearance of coarseness, the use of a spray of coffee oil incident to the blending operation therefore will be seen to be quite functional in accordance with the objects of the present invention.

In practicing the present process the oil-plated blend of major and minor fractions will be charged with a minimum of vibration and attrition to a glass jar filling station. Filling will preferably be practiced under conditions wherein gravityflow rather than any pressure differential or vacuum is the predominant influence to flow. In this way powdering incident to filling is minimized. Typically, the minor fraction will be coblended with the major fraction in a V-blender prior to filling and thereafter using a batch tote system which does not employ vibration to package.

The foregoing major agglommerate fraction is preferably prepared from a coffee either high in Robusta and like low-cost beans, or exclusively Robusta variety. Advantageously, the agglommerated major fraction may be an extract which is decaffeinated and thus in a condition whence it may be combined with the minor fraction at a relative percentage such that the total caffeine level will be less than that of conventional soluble coffee. The weight-level of the fraction will determine the level of caffeine reduction practiced in such applications. Similarly, the minor freeze dried component may be formulated from a high quality costly blend of exclusively Columbian or Santos mild coffee. Other combinations or variations within the foregoing spirit of the invention will occur to persons skilled in the art from reading the accompanying examples.

MODE OF OPERATION OF THE INVENTION

Example 1

200 pounds of Robusta coffee beans were contracted with water in a typical countercurrent extraction system. The resulting extract contained 80 pounds of dissolved coffee solids and 270 pounds of water. The extract was spray dried into spherical particles. Dry soluble coffee was collected at the bottom of the dryer at a final powder moisture of 1.65 percent. The powder passed through a 16 U.S. Standard mesh screen.

Spray dried powder or spheres were then transported and fed to a grinder where the powder was simultaneously ground and cooled with liquid $CO_2$ to 35°–40°F producing a fine powder of predominantly shattered spherical shapes capable of passing through a 100 U.S. Standard Sieve. The cold ground powder was then dropped into a stream of steam emanating from two horizontal nozzles in an agglommerator of the construction shown in U.S. Pat. No. 3,554,760 operating at a combined powder to steam flow rate of approximately 1:1 to cause the finely ground particles to coalesce. The wetted agglommerates were then dried by mixing with hot air entering the agglommerator. The agglommerate falls by gravity to the bottom of the agglommerator where it passes through a cooling tunnel which, by means of chilled air, cools the agglommerate to 80°F. After leaving the cooling tunnel the agglommerate is screened. The +6 (coarse) fraction and the −30 (fine) fraction are removed; the material thus removed is recycled to the grinder to break the agglommerates. Sufficient product from between the screens is also recycled to obtain a total recycle rate of 30 percent of the agglommerator feed. The inlet temperature, the outlet temperature, steam product and recycle rates are adjusted to produce a dark brown color and a final product moisture of 5.0 percent. 76 pounds of agglommerate were thus produced. The agglommerate density with 0.21 gm/cc.

The screen analysis for the agglommerate was as follows:

| U.S. Standard Sieve | % |
| --- | --- |
| On 8 | 18 |
| 12 | 17 |
| 20 | 31 |
| 40 | 19 |
| Through 40 | 15 |

Simultaneous with production of the agglommerate, a separate roasting, grinding and extraction was used to produce a 24 percent solids extract from 150 pounds of Columbian coffee beans. The extract was spread on a freezing belt. Rapid freezing was accomplished by a total elapsed time on the belt of 10 minutes. The frozen extract was then ground and vacuum freeze dried to a final product moisture of 1.2 percent. The dried product was a very light tan color. The freeze dried product was screened to produce a product having the following screen analysis:

| U.S. Standard Sieve | % |
| --- | --- |
| On 8 | .5 |
| 12 | 12.0 |
| 20 | 58.0 |
| 40 | 22.0 |
| Through 40 | 7.5 |

The screened freeze dried product had a bulk density of 0.23 gm/cc.

The agglommerate and screened freeze dried materials thus produced were then blended in 30 pound batches (20 pounds agglommerate, 10 pounds freeze dried) in a twin-shell blender for 1 minutes, the resulting blended product having a speckled appearance and density of 0.24 gm/cc.

EXAMPLE 2

A blended product produced by the method of Example 1 was hermetically packed in glass containers and subjected to simulated shipping tests equivalent to 2,000 truck miles. Evaluation of the product after simulation showed no gross particle segregation and a uniform blend when tested organoliptically and for density, screen analysis and color.

EXAMPLE 3

A product produced by a method similar to Example 1 was hermetically packed in glass containers, loaded in cardboard shipping cases and shipped 2,500 miles by truck. Evaluation of the resulting product showed no gross segregation and uniformity of taste, density, color and screen analysis.

EXAMPLE 4

A blended product comprised of a major fraction of agglommerated coffees and a minor fraction of freeze dried decaffeinated coffees with the aforementioned particle sizes, were blended by the process described in Example 1. The blended product was hermetically sealed in glass containers, packed in cardboard shipping cases and shipped 2,500 miles by truck. Analysis for caffein content at different areas of the jar showed no gross separation of components.

The blended product of Example 1, hermetically packaged as in Example 2, should have an oxygen content less than 5 percent and should preferably have the density, moisture content and particle size distributions set forth herein and in the accompanying claims. Although the invention has been described in respect of specific embodiments and modes, it will be understood that other modes of practice can be employed within the spirit of this invention.

The blend of fusion agglommerated and freeze dried coarse coffee granules as packaged will be characterized as relatively stable to density change prior to, during and after packaging; the packaged blend does not undergo a density change from a norm between 0.22 and 0.25 gms./cc greater than 10 percent during distribution. The blend is further characterized by the ability of the particles therein to resist total segregation of differently sized particles; also fines generation through interparticle abrasion or otherwise prior to, during and after packaging is minimized. The blend freeze dried and fusion agglommerated particles is also further characterized as relatively free of clumping.

The blending operation to effect distribution of the major and minor fractions should be completed within a period prior to packaging not exceeding 10 minutes and preferably not exceeding 5 minutes. So delicate and critical is the state of the respective particles in their relation to one another, it is most preferred blending be completed within 2 minutes since thereafter a degree of abrasion and attrition will occasion an undesirable change in the particle size distribution, shape and blend stability.

Although the invention has been described in the context of a Robusta coffee for the major fraction and a Milds coffee in the minor fraction, it should be understood that a variety of Arabica species of African export can be employed in the context of an African Robusta. Although Milds are preferably employed exclusively for their flavorful contributions in the minor fraction, Milds from Central America and Columbia being the preferred constituent of the minor fraction, Brazilian coffee typified by Santos may be employed as part of the blend containing the Milds. It is likewise within the spirit of the invention that Milds and South American coffees may be employed as a significant part of the major fraction, all within the practice of good roasting and percolation arts. For economic reasons, however, it is presently preferred that the predominant constituency of the major fraction be composed of Robustas.

We claim:

1. The process for blending a soluble coffee product containing two dissimilar constituents which comprises preparing a dark-colored major fraction by grinding spray dried soluble coffee spheres at 1–3 percent moisture and produced from an extract of Robusta coffee, cooling the ground particles, charging the ground particles to a hot-humid zone of agglomeration wherein the particles are caused to be wetted to increase the overall moisture content of the agglomerate 1–5 percent and elevated in temperature above 100°F while undergoing collision with one another and fusion at points of contact, collecting the agglomerates at a moisture content of 4.0 to 7.0 percent, causing said agglomerated charge to set by cooling to below 100°F and holding the charge at said reduced temperature, the stabilized particles thus agglomerated having a bulk density of 0.15 to 0.25 gms per cc.; and preparing a second, lighter colored minor fraction from a dilute coffee extract that is rapidly frozen, ground and then freeze dried to a moisture content less than 3.0 percent and has a bulk density of 0.20 to 0.25 gms per cc.; and thereafter blending the agglomerated first major fraction and the freeze dried second minor fraction and packaging the blend under hermetic conditions whereby the moistened first fraction undergoes vapor transport to the second, the minor fraction being between 10 and 45 percent of the total blend and the blend moisture being greater than 2.5 percent and less than 5 percent as packaged.

2. The process of claim 1 wherein the moistened agglomerate has a moisture content as collected between 4.75 and 6.5 percent.

3. The process of claim 1 wherein the spray dried soluble coffee spheres are ground to a particle size less than 200 microns prior to agglommeration thereof.

4. The process of claim 3 wherein the ground particles are cooled to a temperature below 80°F prior to charging thereof to the hot, humid zone of agglommeration.

5. The process of claim 1 wherein the agglomerate produced in the hot, humid zone of agglomeration is partially dried by descent in a drying tower and as collected have particles the edges of which are angularly related.

6. The process of claim 5 wherein the agglommerate charge is cooled to below 80°F and wherein the cooled agglomerate is classified to recover coarse and fine particles for recycling to incoming like feed particles to said hot, humid zone of agglommeration.

7. The process of claim 1 wherein the moistened partially dried agglommerate is cooled to below 80°F and further cooled to set the agglommerate.

8. The process of claim 1 wherein said spheres are at a moisture content of 1.5 to 2.0 percent prior to grinding.

9. The process of claim 1 wherein the particles of said second minor fraction have a moisture content of 1.0 to 2.5 percent prior to packaging.

10. The process of claim 1 wherein the granular components of the second minor fraction are reduced to a particle size whereat between 5 and 15 percent passes a U.S. 20 mesh screen and are retained on a U.S. 40 mesh screen.

11. The process of claim 1 wherein the components of both fractions are plated with coffee oil prior to packaging.

12. The process of claim 1 wherein the major fraction is agglommerated from coffee extract predominantly of the Robusta type and wherein the extract for the minor fraction is predominantly composed of blends selected from the class consisting of Columbians, Santos and mixtures thereof.

13. The product of the process of claim 1.

* * * * *

UNITED STATES PATENT OFFICE
CERTIFICATE OF CORRECTION

Patent No. 3,821,429      Dated June 28, 1974

Inventor(s) Michael P. Jolly et al.

It is certified that error appears in the above-identified patent and that said Letters Patent are hereby corrected as shown below:

On the cover page, change inventor's name from "Norman P. Quellette" to -- Norman P. Ouellette --.

On the cover page, after "Attorney, Agent, or Firm," change "Bruno P. Sturzzi" to -- Bruno P. Struzzi --.

In the Abstract, line 4, change "agglommerat-containing" to -- agglommerate-containing --.

In column 3, line 17, change "to" second occurrence, to -- or --.

In column 4, line 31, after "percent" insert -- as packaged; --; line 31, delete "container"; lines 32 and 33, delete "have a jar-product moisture level less than 5 percent"; line 43, change "containe r" to -- container --; line 45, after "have" insert -- a jar-product moisture level less than 5 percent. --.

In column 9, line 1 of Example 1, change "contracted" to -- contacted --.

In column 12, line 10, after "temperature" change the comma to a semi-colon.

Signed and sealed this 3rd day of December 1974.

(SEAL)
Attest:

McCOY M. GIBSON JR.
Attesting Officer

C. MARSHALL DANN
Commissioner of Patents